United States Patent
Nagar et al.

(10) Patent No.: US 9,300,544 B2
(45) Date of Patent: Mar. 29, 2016

(54) CALCULATING WORKLOAD CLOSURE IN NETWORKS

(71) Applicant: International Business Machines Corporation, Armonk, NY (US)

(72) Inventors: Seema Nagar, Bangalore (IN); Amit Anil Nanavati, New Delhi (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/193,454

(22) Filed: Feb. 28, 2014

(65) Prior Publication Data

US 2015/0249575 A1   Sep. 3, 2015

(51) Int. Cl.
*H04L 12/24* (2006.01)
(52) U.S. Cl.
CPC ............ *H04L 41/142* (2013.01); *H04L 41/12* (2013.01)
(58) Field of Classification Search
CPC .... G01C 21/3446; G08C 15/00; G06F 17/50; G06F 17/5031; H04J 3/14; H04L 12/24; H04L 41/12; H04L 41/142; H04Q 11/0421
See application file for complete search history.

(56) References Cited

U.S. PATENT DOCUMENTS

| | | | |
|---|---|---|---|
| 6,000,038 A * | 12/1999 | Scepanovic | G06F 17/5031 703/15 |
| 6,581,104 B1 | 6/2003 | Bereiter | |
| 7,636,325 B2 | 12/2009 | Basu et al. | |
| 8,020,162 B2 | 9/2011 | Benke et al. | |
| 8,363,570 B2 | 1/2013 | Mukherjea et al. | |
| 2002/0027885 A1 * | 3/2002 | Ben-Ami | H04Q 11/0421 370/254 |
| 2009/0040931 A1 * | 2/2009 | Bast | G01C 21/3446 370/238 |
| 2010/0142375 A1 | 6/2010 | Portoles Comeras et al. | |
| 2012/0284410 A1 | 11/2012 | Dudek et al. | |
| 2013/0185415 A1 | 7/2013 | Schnier | |

FOREIGN PATENT DOCUMENTS

CN   101690007 B   6/2013

OTHER PUBLICATIONS

Zhang, Hui, et al., "Optimal Load Balancing in Publish/Subscribe Broker Networks," International Conference on Communications (ICC '08), May 19-23, 2008, pp. 5892-5896, IEEE Digital Library.

* cited by examiner

*Primary Examiner* — Andrew Lai
*Assistant Examiner* — Leon Andrews
(74) *Attorney, Agent, or Firm* — Ference & Associates LLC

(57) ABSTRACT

Methods and arrangements for identifying and characterizing subgraphs of a network. In a network comprising a plurality of nodes and edges, there is identified a subgraph including a plurality of nodes. Communication workload closure of the subgraph is calculated via: identifying and counting all length-2 paths in the network that include at least one of the nodes of the subgraph, each length-2 path including three nodes and two edges interconnecting the three nodes; for each of the length-2 paths, determining whether all three nodes belong to the subgraph; thereupon identifying and counting a subset of the length-2 paths wherein, for each path in the subset, all three nodes of the path belong to the subgraph; and dividing the number of paths in the subset by the total number of length-2 paths that include at least one of the nodes of the subgraph. Other variants and embodiments are broadly contemplated herein.

20 Claims, 6 Drawing Sheets

CALCULATING WORKLOAD CLOSURE IN NETWORKS

BACKGROUND

Generally, when addressing interconnected nodes in a network, a broker (or broker node) can be thought of as a node that permits communication between at least two of its own neighbors, wherein the neighbors otherwise are not connected with one another. While identification of broker nodes can potentially help in identifying sub-networks of the larger network, conventional efforts heretofore have shown significant shortcomings in so doing.

BRIEF SUMMARY

In summary, one aspect of the invention provides a method of identifying subgraphs of a network, said method comprising: utilizing at least one processor to execute computer code configured to perform the steps of: inputting a network comprising a plurality of nodes, and a plurality of edges interconnecting individual nodes among at least a portion of the nodes; identifying a subgraph in the network, the subgraph including a plurality of nodes; calculating communication workload closure of the subgraph, via: identifying and counting all length-2 paths in the network that include at least one of the nodes of the subgraph, each length-2 path including three nodes and two edges interconnecting the three nodes; for each of the length-2 paths, determining whether all three nodes belong to the subgraph; thereupon identifying and counting a subset of the length-2 paths wherein, for each path in the subset, all three nodes of the path belong to the subgraph; and dividing the number of paths in the subset by the total number of length-2 paths that include at least one of the nodes of the subgraph.

Another aspect of the invention provides an apparatus comprising: at least one processor; and a computer readable storage medium having computer readable program code embodied therewith and executable by the at least one processor, the computer readable program code comprising: computer readable program code configured to input a network comprising a plurality of nodes, and a plurality of edges interconnecting individual nodes among at least a portion of the nodes; computer readable program code configured to identify a subgraph in the network, the subgraph including a plurality of nodes; computer readable program code configured to calculate communication workload closure of the subgraph, via: identifying and counting all length-2 paths in the network that include at least one of the nodes of the subgraph, each length-2 path including three nodes and two edges interconnecting the three nodes; for each of the length-2 paths, determining whether all three nodes belong to the subgraph; thereupon identifying and counting a subset of the length-2 paths wherein, for each path in the subset, all three nodes of the path belong to the subgraph; and dividing the number of paths in the subset by the total number of length-2 paths that include at least one of the nodes of the subgraph.

An additional aspect of the invention provides a computer program product comprising: a computer readable storage medium having computer readable program code embodied therewith, the computer readable program code comprising: computer readable program code configured to input a network comprising a plurality of nodes, and a plurality of edges interconnecting individual nodes among at least a portion of the nodes; computer readable program code configured to identify a subgraph in the network, the subgraph including a plurality of nodes; computer readable program code configured to calculate communication workload closure of the subgraph, via: identifying and counting all length-2 paths in the network that include at least one of the nodes of the subgraph, each length-2 path including three nodes and two edges interconnecting the three nodes; for each of the length-2 paths, determining whether all three nodes belong to the subgraph; thereupon identifying and counting a subset of the length-2 paths wherein, for each path in the subset, all three nodes of the path belong to the subgraph; and dividing the number of paths in the subset by the total number of length-2 paths that include at least one of the nodes of the subgraph.

A further aspect of the invention provides a method comprising: in a network comprising a plurality of nodes and edges, identifying a subgraph; calculating a communication metric of the subgraph, via: identifying and counting s sets of: three nodes and two interconnecting edges having at least one node in the subgraph; for each of the sets s, determining whether all three nodes belong to the subgraph; thereupon identifying and counting the number n of the sets s where all three nodes of the path belong to the subgraph; and dividing n by s.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
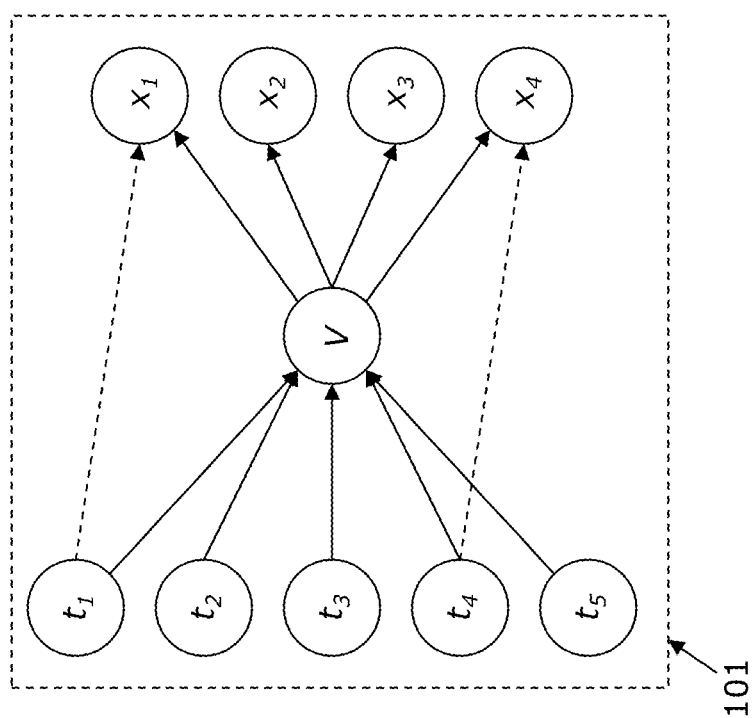
FIG. 1 schematically illustrates a general network of interconnected nodes.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at $12'$ in FIG. 6. In accordance with an example embodiment, most if not all of the process steps, components and outputs discussed with respect to FIGS. 1-4 can be performed or utilized by way of a processing unit or units and system memory such as those indicated, respectively, at $16'$ and $28'$ in FIG. 6, whether on a server computer, a client computer, a node computer in a distributed network, or any combination thereof.

For background purposes, general concepts relating to nodes in a network and their connectivity can be found in commonly assigned U.S. Pat. No. 8,363,570 to Mukerjea et al., "Systems and Methods for Finding Star Structures as Communities in Networks".

In accordance with t context associated with at least one embodiment of the invention, as mentioned above, a broker node in a network of nodes interconnects at least two of its neighbor nodes that otherwise are not connected with one another. (The terms "network" and "sub-network" may be considered to be interchangeable herein with "graph" and "sub-graph", respectively. The term "neighbor", as employed herein with respect to a node, may be understood to represent another node with which the node is directly connected via a single edge, or via a "one-hop" or "length-1" connection. Nodes that are "neighbors" of one another can also be considered to be "adjacent". The term "node" may also be considered to be interchangeable with "vertex".) As understood herein, a node may represent any of a great variety of entities that can be connected in a communicative realm or in a manner otherwise lending itself to a tangible or functional connection (e.g., connective or reporting relationships within an organization). Thus, merely by way of illustrative examples, a node could be embodied by a computer or other machine capable of communication (e.g., a tablet computer or mobile phone), or could simply represent an entity such as an individual or cohesive group of individuals within an organization. Nodes can be represented in other networks or areas as well, including biological (e.g., where a "node" could be a region of a human or animal brain) and electrical (e.g., where a "node" could be a connective point or customer with respect to an electricity distribution grid).

Generally, in accordance with a context of at least one embodiment of the invention, FIG. 1 schematically illustrates a network 101 comprising several nodes. As shown, a broker node V (which may alternatively be termed a "hub") may act as an intermediary in communication for several pairs of nodes. Thus, in the present example nodes $t_1 \ldots t_5$ connect to nodes $x_1 \ldots x_4$ solely through V. (Accordingly, for node $t_1$ to effectively connect to $x_1$, or for $t_4$ to effectively connect to $x_4$, as indicated with dotted arrows in each case, communication must in fact be routed through broker/hub V.)

Broadly contemplated herein, in accordance with at least one embodiment of the invention, is a metric that may be termed a communication workload closure coefficient (CWCC) for components (e.g., one or more sub-graphs or sub-networks) in a network. This quantity measures a degree to which a component is dependent on entities outside of the sub-network for communications among its own members.

Figure 2:
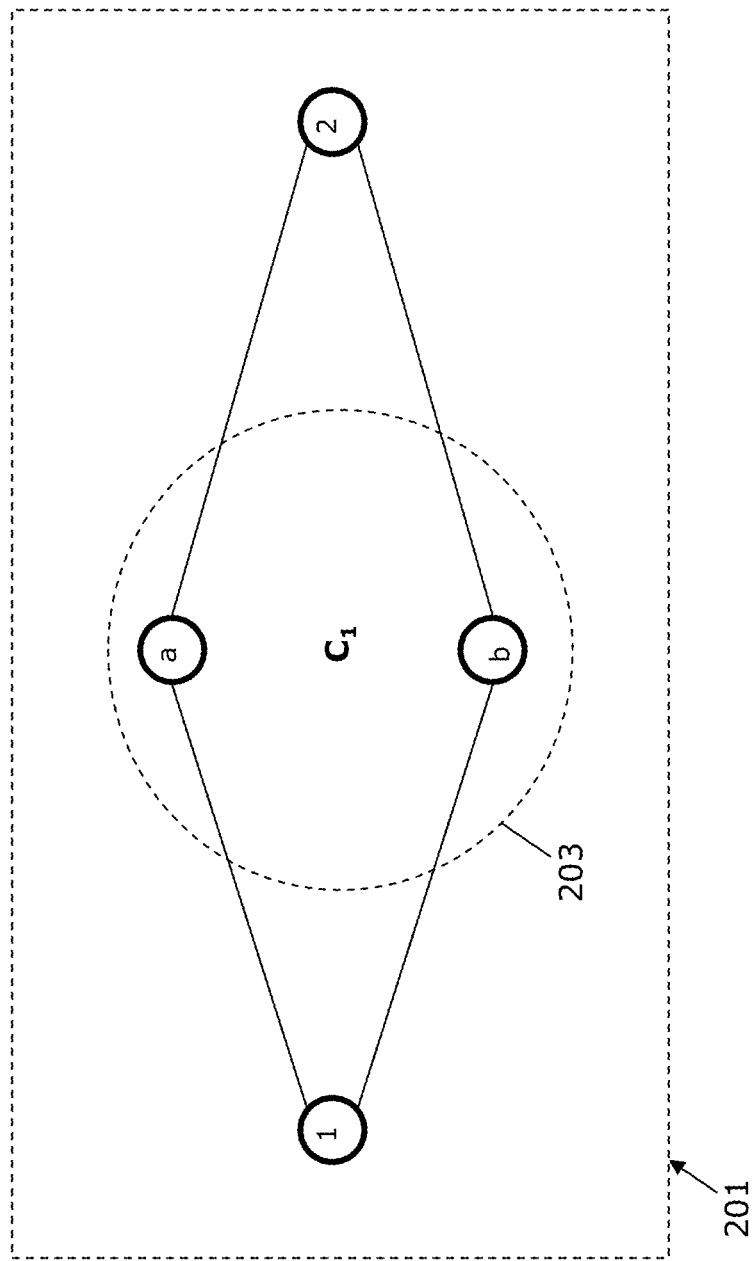
FIG. 2 schematically illustrates a community showing individual members and external connections.

By way of illustrative example, in accordance with at least one embodiment of the invention, FIG. 2 schematically illustrates a network 201 including a community $C_1$ (203), members a and b thereof, along with nodes 1 and 2 external to $C_1$. ("Community" may be understood here to encompass a collection of nodes that may or may not be connected with one another in the context of a larger network. Thus, "community" may be understood, for the present illustrative purposes, to be interchangeable with "sub-network", "sub-graph" or "group".) Particularly, each community member a and b is connected to external nodes 1 and 2, but not to each other. Nodes a and b, for their part, are thus dependent on nodes 1 and 2 for communication with one another. Generally, CWCC is calculated as being equal to the number or pairs of non-adjacent nodes within a community that have at least one common neighbor that lies within that community, divided by the total number of pairs of non-adjacent nodes in the group that have at least one common neighbor inside or outside of the community. Thus, in the example of FIG. 2, for $C_1$, CWCC=0/1=0. In other words, the community $C_1$ contains one pair of non-adjacent nodes, a and b. These do not have any common neighbor lying within the community (=0), but have at least one common neighbor (1 or 2 can be considered here) lying "inside or outside" (in this case, outside) of the community (=1).

In accordance with at least one embodiment of the invention, an analogous manner of defining CWCC is as follows. There is input a network comprising a plurality of nodes, and a plurality of edges interconnecting individual nodes among at least a portion of the nodes. A subgraph is identified in the network, wherein this subgraph includes a plurality of nodes; these nodes, in actuality, may or may not be directly connected with one another. CWCC of the identified subgraph is then calculated first by identifying and counting all length-2 paths in the network that include at least one of the nodes of the subgraph. Here, "length-2" refers to a "two-hop" connection where there are three nodes and two edges interconnecting the three nodes. In other words, if there are three nodes that can be identified as A, B and C, a length-2 path can involve A being connected to B via one edge and B being connected to C via another edge; A and C would be termini of this length-2 path. This length-2 path is not counted if A and C are otherwise directly connected to one another (thus forming a three-way set of connections between A, B and C); length-2 paths are only counted here if the termini themselves are non-adjacent.

Continuing, in accordance with at least one embodiment of the invention, for each of the length-2 paths (that have been identified/counted as noted above), a determination is made as to whether all three nodes in that length-2 path belong to the identified subgraph. Out of all of the length-2 paths identified/counted as noted above, a subset of the same is then identified (and counted) wherein all three nodes of the path do belong to the identified subgraph. The number of paths in this subset is then divided by the total number of length-2 paths previously identified/counted to yield CWCC.

In accordance with at least one embodiment of the invention, CWCC helps qualify and quantify communication interdependence between any pair of entities (such as nodes or communities). Particularly, relationship quality can be characterized, e.g., as pairwise, symbiotic, one-way or multigroup. Otherwise, the extent of dependency between components can be quantified. Additionally, the CWCC can be aggregated at the network level as a single quantity measure of communication interdependency for the whole network; this could be valuable, e.g., in determining average values for various subgraphs within the network and then determining a general distribution of CWCC. To this last point, meaningful insights can then be gained in comparing the average CWCC for the whole network against individual subgraph CWCCs, and/or plotting a distribution of CWCCs among subgraphs.

Generally, in accordance with at least one embodiment of the invention, the CWCC can help in analysis and design of the communication structure of any network. Taking the example of an organization, it can be appreciated that an organization includes organizational units (OUs). Based on the CWCC metric, it is then possible to analyze whether inter-OU communication is excessive or deficient, based on the role of particular OUs. The design of a network can also be informed by CWCC, as will be appreciated more fully below.

Figure 3:
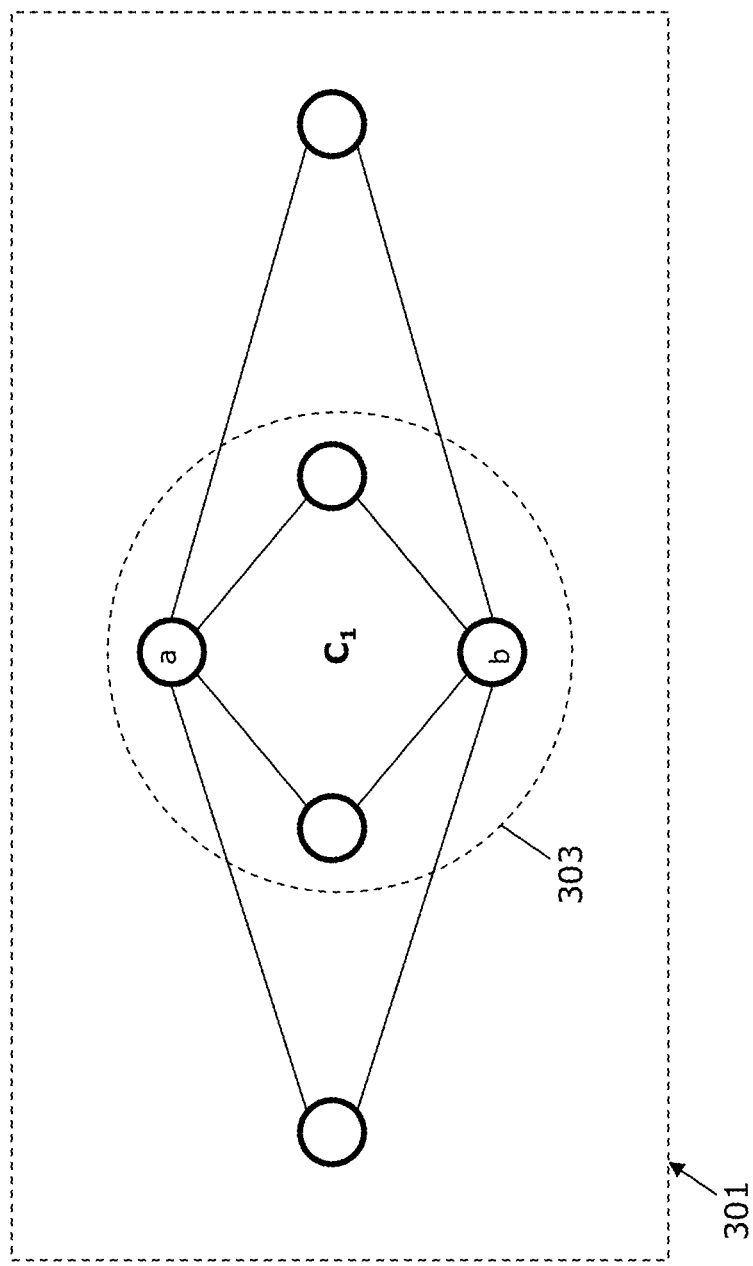
FIG. 3 schematically illustrates another example of a community showing individual members and external connections.

In accordance with at least one embodiment of the invention, FIG. 3 schematically illustrates another example of a network 301 with a community 303 showing individual members and external connections. Community $C_1$ (303) here may also be thought of as a component, or sub-network. As shown, a and b belong to $C_1$ but are not directly connected with one another, while four nodes (two internal to $C_1$ and two outside) act as brokers for a and b. Thus, the workload generated by a and b is partly served by internal nodes and partly by external nodes. Inasmuch as a network may include components, where a component is a community constructed based on edges (and thus can be defined, e.g., as dense or sparse) or on "interest" (and thus can be defined on a basis of attributes), a question can be offered as to how much of the workload generated by $C_1$ is served within $C_1$.

In accordance with at least one embodiment of the invention, a pair of edges (or spokes) may be characterized as "workload-closed" if they, and at least one of their hubs (or brokers), have identical attribute values. A group of nodes having identical attribute values can also be considered to be workload-closed if for all pairs of spokes in the group, one of their hubs is also in the group. Further, a closed group can be noted to have the property that all intra-group communication can be served by nodes in the group. As such, the CWCC described herein indicates the proportion of the number or pairs of spokes in a group that are closed to the total number of pairs of spokes in the group. All pairs of spokes in a group, and any subset pair(s) of spokes that have a hub in the group, are enumerated by way of calculating CWCC.

Figure 4:
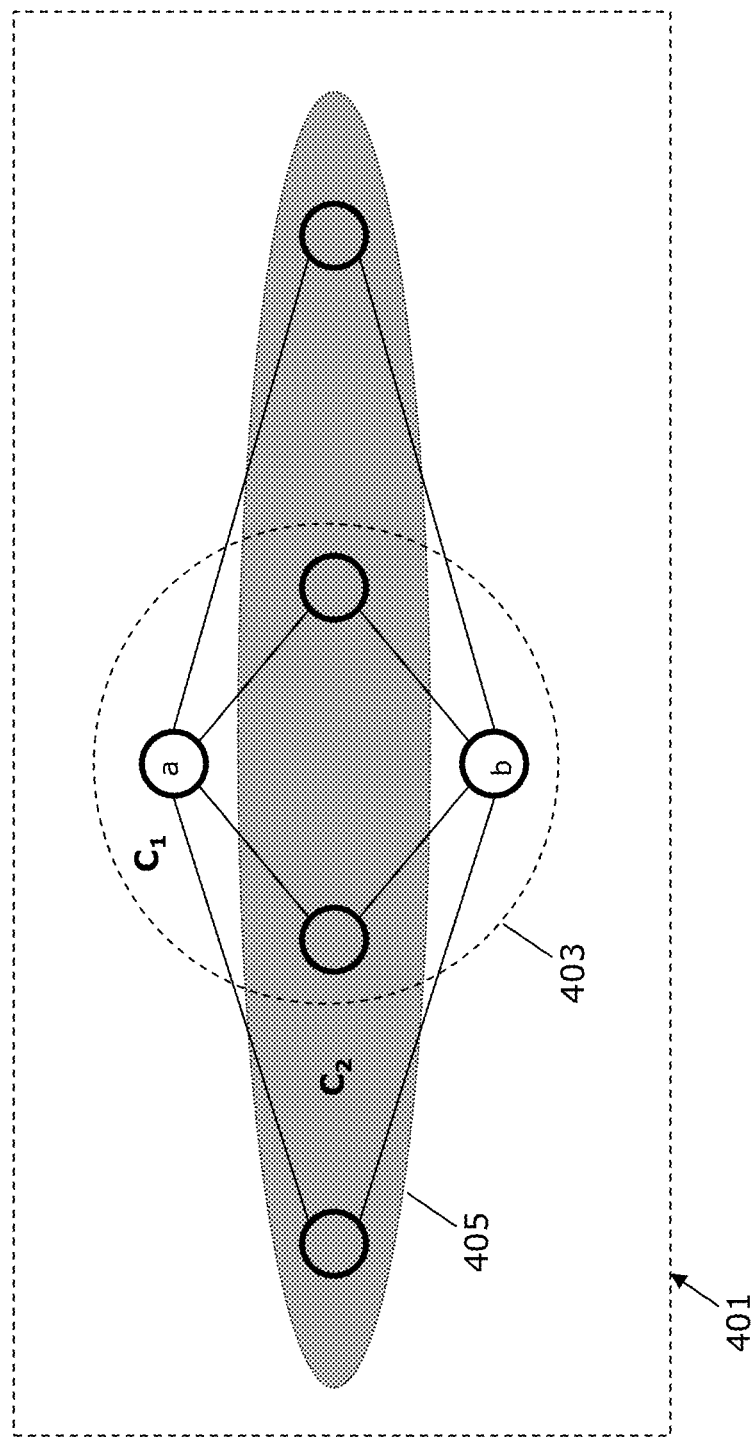
FIG. 4 schematically illustrates the example of FIG. 3, with the addition of another community.

In accordance with at least one embodiment of the invention, FIG. 4 schematically illustrates the example of FIG. 3, with the addition of another community $C_2$. This example serves to show that communities can overlap, and it can be appreciated that meaningful insights can be gained by calculating CWCC with respect to either community along with calculating it with respect to the entire network.

Generally, in accordance with at least one embodiment of the invention, CWCC calculation as broadly contemplated herein can be employed to identify and assign roles to subnetworks. For instance, there can be a determination of the extent of brokerage needs among pairs in a community that are handled by nodes within the community. A determination can also be made as to which communities are "self-sufficient", which are "parasites" and which share a symbiotic relationship. Relationships among a group of communities can also be labeled, e.g., as cyclical or hierarchical. All of these determinations can be made quantitatively, e.g., via thresholds. (For instance, thresholds could be defined such that if less than 2% of pairs of nodes that have a common neighbor end up having a common neighbor within a community, the community is practically "self-sufficient".)

Various working embodiments are broadly contemplated herein, in accordance with at least one embodiment of the invention. For instance, a study can be made as to which portion of a macaque brain has the highest CWCC, and the percentage of the overall available brain workload that it takes care of. Other working examples can include, e.g., a study of connections and communities within organizations and sub-organizations.

In accordance with at least one embodiment of the invention, reciprocal closure of a subnetwork S measures a proportion or quantity of external subnetworks (i.e., subnetworks other than S itself), or portions thereof, which depend(s) upon S for their workload closure and the extent to which they depend upon it. Two different manners of calculating reciprocal workload closure are broadly contemplated herein, involving a coarse calculation and a fine calculation. For the coarse calculation, there is determined a proportion of external subnetworks dependent upon a subnetwork S for workload closure. By way of an illustrative working example, let it be assumed that there are 5 communities (C1 . . . C5) in all; consider community C1 here to correspond to the aforementioned subnetwork S. It is then determined that pairs of non-adjacent nodes in each of the communities C2, C3 and C4, but not in C5, have a common neighbor in C1. Then it can be said that the coarse reciprocal closure of C1 is ¾, or 0.75; in other words, there are 3 external communities that rely on communication via C1 out of a maximum possible 4 external communities. For the fine calculation, a further step is taken to determine, with respect to external subnetworks, as to the proportion of non-adjacent node pairs therein that have a common neighbor in the reference subnetwork S. Continuing with the present illustrative working example, let it be assumed that 35% of non-adjacent neighbors in C2, 40% of those C3 and 25% of those in C4 have an adjacent neighbor in C1. Reciprocal closure is then calculated as (0.35+0.4+0.25)/4=¼, or 0.25. (It has already been determined, of course, that there are no non-adjacent neighbors at all in C5 that have a common adjacent neighbor in C1.)

In accordance with at least one embodiment of the invention, the workload profile of a graph is the distribution of the workload closure coefficients of all the communities in the graph. The workload index is the average of the CWCCs of all the components in the graph, and can be said to represent an "essential signature" of the graph.

In accordance with at least one embodiment of the invention, it can be appreciated that the parameters discussed herein, including CWCC, reciprocal closure, workload profile and workload index can be used for analyzing organizational structures and behaviors, wherein a structure can be modified based on the function to obtain optimal results. Consumer community behaviors can also be analyzed; for instance, social communities (e.g., social media friend networks) can be analyzed to derive insights about community behavior and even analyze the diffusion of trends in more precise ways.

Figure 5:
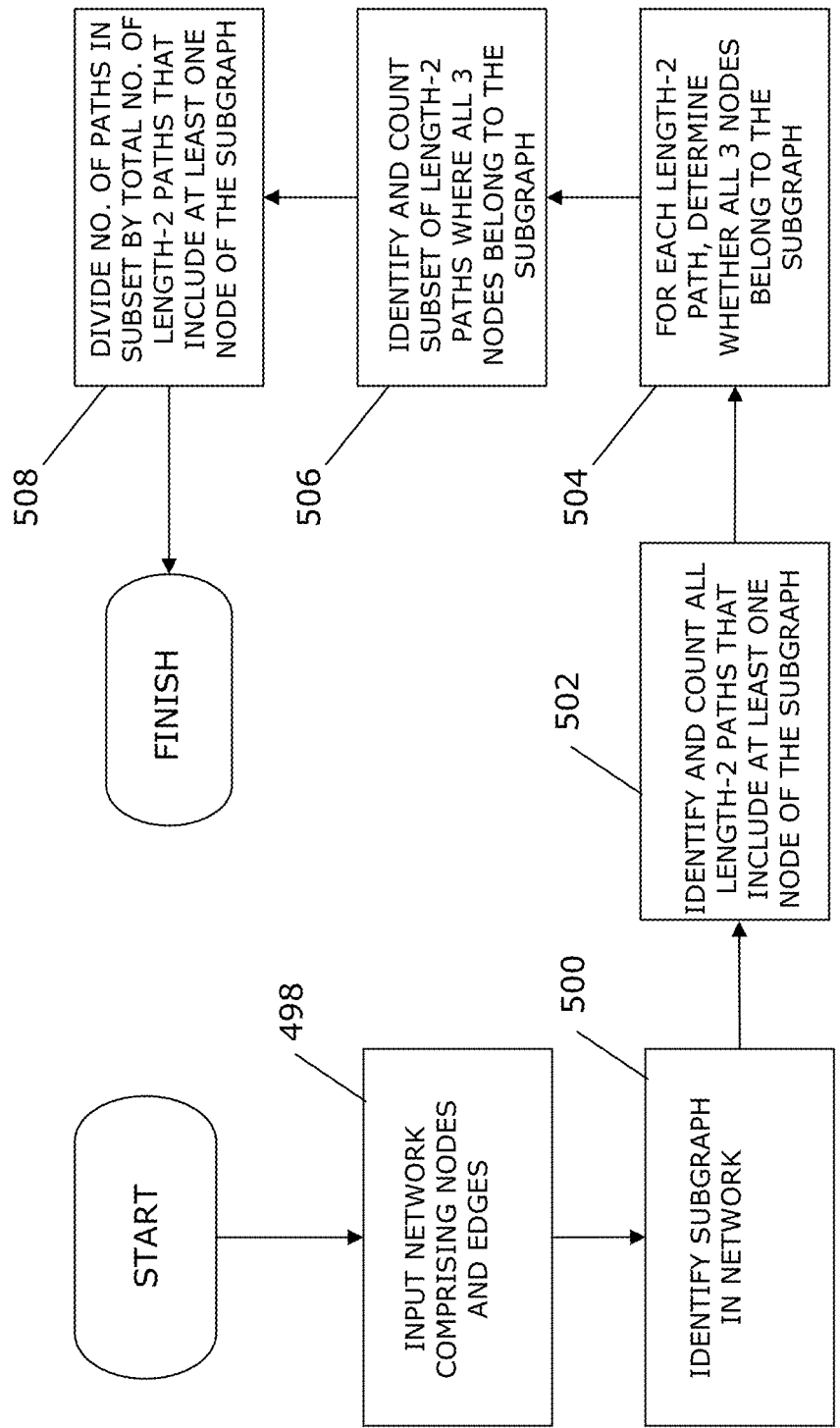
FIG. 5 sets forth a process more generally for identifying and characterizing subgraphs in a network.

FIG. 5 sets forth a process more generally for identifying and characterizing subgraphs in a network, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, there is inputted a network comprising a plurality of nodes, and a plurality of edges interconnecting individual nodes among at least a portion of the nodes (498). There is identified a subgraph in the network, the subgraph including a plurality of nodes (500). Communication workload closure of the subgraph is calculated via: identifying and counting all length-2 paths in the network that include at least one of the nodes of the subgraph, each length-2 path including three nodes and two edges interconnecting the three nodes (502); for each of the length-2 paths, determining whether all three nodes belong to the subgraph (504); thereupon identifying and counting a subset of the length-2 paths wherein, for each path in the subset, all three nodes of the path belong to the subgraph (506); and dividing the number of paths in the subset by the total number of length-2 paths that include at least one of the nodes of the subgraph (508).

Figure 6:
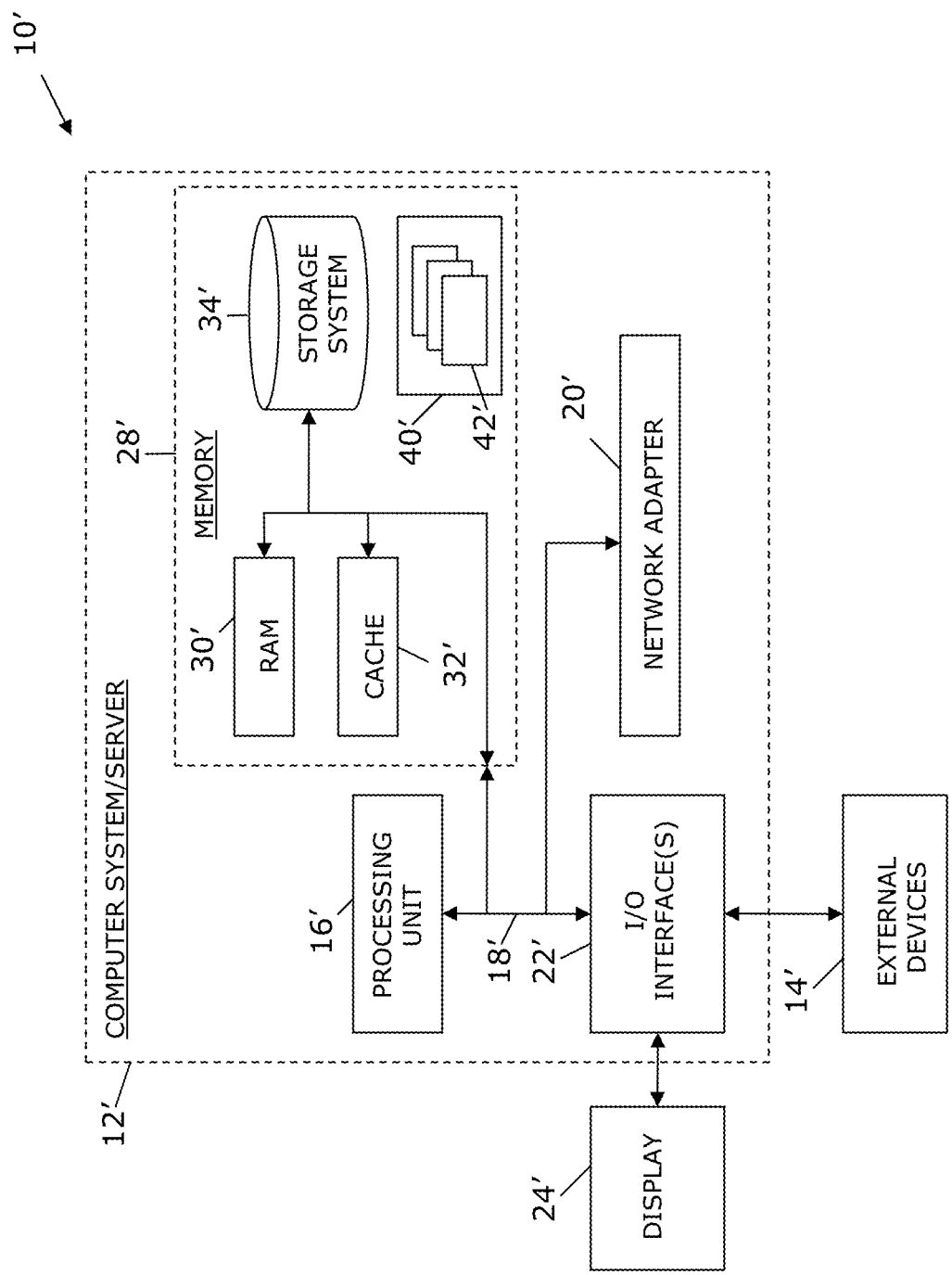
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying subgraphs of a network, said method comprising:
    utilizing at least one processor to execute computer code configured to perform the steps of:
    inputting a network comprising (i) a plurality of nodes, and (ii) a plurality of edges interconnecting individual nodes among at least a portion of the nodes;
    identifying a subgraph in the network, the subgraph including a plurality of nodes;
    calculating communication workload closure of the subgraph, via:
    identifying and counting all length-2 paths in the network that include at least one of the nodes of the subgraph, each length-2 path including three nodes and two edges interconnecting the three nodes;
    for each of the length-2 paths, determining whether all three nodes belong to the subgraph;
    thereupon identifying and counting a subset of the length-2 paths wherein, for each path in the subset, all three nodes of the path belong to the subgraph; and
    dividing a number of paths in the subset by a total number of length-2 paths that include at least one of the nodes of the subgraph.

2. The method according to claim 1, comprising calculating reciprocal workload closure with respect to the identified subgraph.

3. The method according to claim 2, wherein said calculating of reciprocal workload closure comprises rendering a coarse calculation via:
    identifying the subgraph as a first subgraph;
    identifying and counting a total number of other subgraphs in the network; and
    calculating a proportion of the other subgraphs that are dependent upon the first subgraph for workload closure.

4. The method according to claim 3, wherein said calculating of a proportion comprises:
    counting the number N of subgraphs which include at least one non-adjacent pair of nodes having a common neighbor in the first subgraph; and
    dividing N by the total number of subgraphs in the network.

5. The method according to claim 3, wherein said calculating of reciprocal workload closure comprises rendering a fine calculation via:
    determining, for each of the other subgraphs in the network, a proportion of non-adjacent node pairs having a common neighbor in the first subgraph;
    summing the determined proportions from all of the other subgraphs in the network to yield a sum; and
    dividing the sum by the total number of other subgraphs in the network.

6. The method according to claim 1, comprising determining a workload profile with respect to the network.

7. The method according to claim 6, wherein said determining of a workload profile comprises:
    identifying all subgraphs in the network;
    determining a workload closure coefficient with respect to each subgraph; and
    representing a distribution of the workload closure coefficients with respect to all subgraphs in the network.

8. The method according to claim 7, comprising calculating a workload index with respect to the network.

9. The method according to claim 8, wherein the workload index represents an average of all the workload closure coefficients with respect to all subgraphs in the network.

10. The method according to claim 9, comprising calculating reciprocal workload closure with respect to the identified subgraph.

11. The method according to claim 10, wherein said calculating of reciprocal workload closure comprises rendering a coarse calculation via:
    identifying the subgraph as a first subgraph;
    identifying and counting a total number of other subgraphs in the network; and
    calculating a proportion of the other subgraphs that are dependent upon the first subgraph for workload closure.

12. The method according to claim 11, wherein said calculating of a proportion comprises:
    counting the number N of subgraphs which include at least one non-adjacent pair of nodes having a common neighbor in the first subgraph; and
    dividing N by the total number of subgraphs in the network.

13. The method according to claim 11, said calculating of reciprocal workload closure comprises rendering a fine calculation via:
    determining, for each of the other subgraphs in the network, a proportion of non-adjacent node pairs having a common neighbor in the first subgraph;
    summing the determined proportions from all of the other subgraphs in the network to yield a sum; and
    dividing the sum by the total number of other subgraphs in the network.

14. An apparatus comprising:
    at least one processor; and
    a computer readable storage medium having computer readable program code embodied therewith and executable by the at least one processor, the computer readable program code comprising:
    computer readable program code configured to input a network comprising a plurality of nodes, and a plurality of edges interconnecting individual nodes among at least a portion of the nodes;
    computer readable program code configured to identify a subgraph in the network, the subgraph including a plurality of nodes;
    computer readable program code configured to calculate communication workload closure of the subgraph, via:
    identifying and counting all length-2 paths in the network that include at least one of the nodes of the subgraph, each length-2 path including three nodes and two edges interconnecting the three nodes;
    for each of the length-2 paths, determining whether all three nodes belong to the subgraph;
    thereupon identifying and counting a subset of the length-2 paths wherein, for each path in the subset, all three nodes of the path belong to the subgraph; and
    dividing a number of paths in a subset by the total number of length-2 paths that include at least one of the nodes of the subgraph.

15. A computer program product comprising:
    a non-transitory computer readable storage medium having computer readable program code embodied therewith, the computer readable program code comprising:
    computer readable program code configured to input a network comprising a plurality of nodes, and a plurality of edges interconnecting individual nodes among at least a portion of the nodes;

computer readable program code configured to identify a subgraph in the network, the subgraph including a plurality of nodes;

computer readable program code configured to calculate communication workload closure of the subgraph, via:

identifying and counting all length-2 paths in the network that include at least one of the nodes of the subgraph, each length-2 path including three nodes and two edges interconnecting the three nodes;

for each of the length-2 paths, determining whether all three nodes belong to the subgraph;

thereupon identifying and counting a subset of the length-2 paths wherein, for each path in the subset, all three nodes of the path belong to the subgraph; and dividing a number of paths in the subset by a total number of length-2 paths that include at least one of the nodes of the subgraph.

16. The computer program product according to claim 15, comprising computer readable program code configured to calculate reciprocal workload closure with respect to the identified subgraph.

17. The computer program product according to claim 16, wherein the calculation of reciprocal workload closure comprises rendering a coarse calculation via:

identifying the subgraph as a first subgraph;

identifying and counting a total number of other subgraphs in the network; and calculating a proportion of the other subgraphs that are dependent upon the first subgraph for workload closure.

18. The computer program product according to claim 17, wherein the calculation of a proportion comprises:

counting the number N of subgraphs which include at least one non-adjacent pair of nodes having a common neighbor in the first subgraph; and dividing N by the total number of subgraphs in the network.

19. The computer program product according to claim 17, wherein the calculation of reciprocal workload closure comprises rendering a fine calculation via:

determining, for each of the other subgraphs in the network, a proportion of non-adjacent node pairs having a common neighbor in the first subgraph;

summing the determined proportions from all of the other subgraphs in the network to yield a sum; and dividing the sum by the total number of other subgraphs in the network.

20. A method comprising: utilizing at least one processor to execute computer code configured to perform the steps of:

in a network comprising a plurality of nodes and edges, identifying a subgraph;

calculating a communication metric of the subgraph, via:

identifying and counting a number of s sets of: three nodes and two interconnecting edges having at least one node in the subgraph;

for each of the identified sets s, determining whether all three nodes belong to the subgraph;

thereupon identifying and counting a number n of the identified sets s where all three nodes of the path belong to the subgraph; and determining the communication metric by dividing the number n by the number s.

* * * * *